United States Patent
Thiemann et al.

(10) Patent No.: US 6,826,894 B2
(45) Date of Patent: Dec. 7, 2004

(54) POSITION CONTROL FOR A CROP PICKUP DEVICE

(75) Inventors: Holger Thiemann, Gütersloh (DE); Hubert Uhlending, Dümen (DE); Ludwig Dammann, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 10/463,298

(22) Filed: Jun. 17, 2003

(65) Prior Publication Data

US 2004/0006958 A1 Jan. 15, 2004

(30) Foreign Application Priority Data

Jun. 19, 2002 (DE) .......................................... 102 27 484

(51) Int. Cl.[7] .............................................. A01D 75/28
(52) U.S. Cl. ..................................... 56/10.2 E; 701/50
(58) Field of Search .......................... 56/10.2 E, 10.2 F, 56/10.2 R, 10.2 D, 208, DIG. 10, DIG. 15; 172/2, 3, 4, 4.5

(56) References Cited

U.S. PATENT DOCUMENTS

| | | | |
|---|---|---|---|
| 4,136,508 A | * | 1/1979 | Coleman et al. ............... 56/208 |
| 4,507,910 A | * | 4/1985 | Thornley et al. ......... 56/10.2 E |
| 4,776,153 A | * | 10/1988 | DePauw et al. ......... 56/10.2 E |
| 4,942,724 A | | 7/1990 | Diekhans et al. |
| 5,155,984 A | * | 10/1992 | Sheehan .................. 56/10.2 E |
| 5,359,836 A | * | 11/1994 | Zeuner et al. ............ 56/10.2 E |
| 5,471,825 A | * | 12/1995 | Panoushek et al. ....... 56/10.2 E |
| 5,704,200 A | * | 1/1998 | Chmielewski et al. ... 56/10.2 E |
| 5,715,666 A | * | 2/1998 | Huster et al. ............. 56/10.2 F |
| 5,794,421 A | | 8/1998 | Maichle |
| 5,828,971 A | * | 10/1998 | Diekhans et al. ............. 701/41 |
| 5,911,669 A | * | 6/1999 | Stentz et al. .............. 56/10.2 F |
| 5,937,621 A | * | 8/1999 | Eggenhaus ................ 56/10.2 E |
| 6,041,583 A | * | 3/2000 | Goering et al. .......... 56/10.2 E |
| 6,095,254 A | * | 8/2000 | Homburg ........................ 172/6 |
| 6,202,395 B1 | * | 3/2001 | Gramm ................... 56/10.2 E |
| 6,289,659 B1 | * | 9/2001 | Fox ......................... 56/10.2 E |
| 6,389,785 B1 | * | 5/2002 | Diekhans et al. ......... 56/10.2 F |
| 6,397,569 B1 | * | 6/2002 | Homburg et al. ......... 56/10.2 F |
| 6,523,333 B2 | * | 2/2003 | Metzger .................. 56/10.2 E |
| 6,588,187 B2 | * | 7/2003 | Engelstad et al. ........ 56/10.2 E |
| 6,615,570 B2 | * | 9/2003 | Beck et al. ............... 56/10.2 E |

FOREIGN PATENT DOCUMENTS

| | | |
|---|---|---|
| DE | 3807610 | 9/1989 |
| DE | 4406892 | 9/1995 |
| DE | 29519842 | 2/1996 |

* cited by examiner

Primary Examiner—Árpád F. Kovács
(74) Attorney, Agent, or Firm—Husch & Eppenberger, LLC; Robert C. Haldiman

(57) ABSTRACT

A position control for a crop pickup device which is mounted for vertical movement relative to an agricultural harvester. A measuring device is provided for determining the distance from the crop pickup device to the ground, wherein the position of the crop pickup device relative to the ground is adjustable by one control device as a function of the measured ground distance. The distance to the ground is determined by the measuring device at two points spaced from each other in the direction of travel. As a result, advantageously the inclination of the ground can be determined and used for optimized control of ground simulation of the crop pickup device. Additionally, the cutting angle can be adapted automatically to the slope of the ground, to avoid crop losses and impede damage to the grain header.

45 Claims, 4 Drawing Sheets

POSITION CONTROL FOR A CROP PICKUP DEVICE

CROSS-REFERENCE TO RELATED APPLICATIONS

This application claims foreign priority under 35 USC §119 to prior foreign application 102 27 484.3 filed in Germany on Jun. 19, 2002.

TECHNICAL FIELD OF THE INVENTION

The invention relates generally to agricultural harvesting machines and, more specifically, to an apparatus and a method for position control of a crop pickup device.

DESCRIPTION OF THE RELATED ART

Agricultural harvesting machines generally pick up crop by a crop pickup device. The crop pickup device has the function of picking up the crop to the ground without crop losses and without damage to the crop pickup device or to the ground.

Crop pickup devices are commonly referred to as headers, such as grain headers, forage headers, and corn headers. Crop pick devices generally cut the crop from the field before picking up the crop. Some crop devices, such as corn pickers and grain strippers, separate the cobs or the ears from the crop and then pick them up. Other crop devices pick up the crop previously cut from the field and gather the cut crop into a swath.

To avoid damage to the crop pickup device or the ground, as well as to provide efficient pickup of the crop, the maintenance of a given distance from the crop pickup device to the ground is required. For this purpose, the feeder housing, which carries the crop pickup device, can be pivoted by means of hydraulic cylinders linked to the frame of the agricultural harvesting machine. In this manner, the working height of the crop pickup device can be adjusted. It has proved particularly advantageous to detect the distance from the crop pickup device to the ground by a mechanical ground sensor. Through the use of a subsequent control device, a constant working height of the crop pickup device above the ground can be maintained.

If the crop pickup device has a huge working width, it is necessary to determine the distance to the ground at several points distributed across the working width for satisfactory vertical guiding. For this purpose several ground sensors can be arranged on the crop pickup device, as is known for example from DE 38 07 610, on the lower side of a grain header.

The grain header disclosed in DE 38 07 610 has ground sensors mounted in pairs at the outer ends of the bottom of the header and behind the finger bar. Each pair of ground sensors delivers one distance value to the ground. The two ground distance values are processed by a control device in such a way that the mean value determines the adjustment of the feeder housing, and hence the working height of the grain header above the ground. The grain header shown in DE 38 07 610 is carried by two vertical lifting cylinders arranged on the sidewalls of the feeder housing. A controlled movement of the lifting cylinders can pivot the grain header about a central axis of the harvester. The ground distance values determined by the ground sensors are used in return by a control device to control the transverse inclination of the grain header by means of lifting cylinders, so that a uniform working height of the grain header is obtained; and hence, providing a uniform cutting height of the finger bar. Unilateral sinking of a front wheel or a change of inclination of the field terrain is detected by the ground sensors and the crop pickup device is automatically leveled out. However, the ground sensors detect the ground profile only after picking up the crop, with the result that automatic ground simulation is triggered too late, and there can be damage to the finger bar as well as to the ground. Further, it is not possible to maintain a uniform cutting height, particularly when the ground contour or profile has changed. For instance, when cutting against a slope, too short a cutting height can be achieved with this arrangement of the ground sensors.

DE 295 19 842 U1 discloses a hillside combine harvester having a swinging adapter at the front end of the feeder housing. A hydraulic control device can pivot the grain header mounted thereon about a horizontal axis. Lifting cylinders engaging the swinging adapter can effect suitable adaptation of the cutting angle of the grain header. Thus, it is also possible to adjust the cutting angle of the header for adaptation to different cutting heights. However, this kind of set up does not allow for instantaneous adjustment relative to the slope of the ground. Therefore, particularly when the height of the ground has changed, the cutting angle cannot be optimally adjusted.

It is further known, for example from DE 44 06 892 A1, that the distance from a crop pickup device to the ground can be sensed contactlessly by a ground distance sensor arranged in a crop divider. By this means, a rapid reaction of ground simulation to ground variation becomes possible as different cutting heights of the headers are necessary, particularly when the ground is rising or falling in the direction of travel. This may lead to early lowering of the header which can lead to placement of the header trough on the ground and hence damage the header.

The present invention is directed to overcoming one or more of the problems set forth above.

SUMMARY OF THE INVENTION

In accordance with one aspect of the present invention there is provided a position control apparatus for a crop pickup device; means for mounting the crop pickup device for vertical movement relative to an agricultural harvesting machine; measuring means for determining distances from the crop pickup device to the ground at a plurality of points spaced from each other in a direction of travel of the agricultural harvesting machine; a control device for adjusting a position of the crop pickup device relative to the ground as a function of the determined distances.

In accordance with another aspect there is provided a method for position control of a crop pickup device mounted on an agricultural harvesting machine for at least vertical movement relative thereto, and with at least one measuring device for determining the distance from the crop pickup device to the ground, the method comprising the steps of measuring a distance to the ground at a plurality of points spaced apart from each other in the direction of travel; and automatically adjusting a position of the crop pickup device relative to the ground as a function of the measured distances and in conjunction with at least one nominal working position.

The measuring device determines the distance to the ground at two or more points spaced from each other in the direction of travel. As a result, determination of the inclination of the crop pickup device in relation to the slope of the ground is possible. Thus, a control device connected to the measuring device can determine the variation in inclination of the ground profile and use this data for optimum control of the cutting height. Furthermore, sinking of the machine in difficult ground conditions or the use of different tire diameters on the agricultural harvesting machine can be detected with reference to altered distances to the ground. Too low or too high a setting of the crop pickup device relative to the ground is reliably detected, and damage to the crop pickup device or to the ground is advantageously avoided. Further, crop losses are reduced.

With a corresponding movable arrangement of the crop pickup device about a longitudinal or central axis of the agricultural harvesting machine, the transverse inclination of the crop pickup device can be advantageously adjusted automatically by a control device as a function of at least two measured distances in conjunction with a nominal working position.

A further advantageous embodiment of the invention arises if the crop pickup device is arranged to be movable about a transverse axis in relation to the agricultural harvesting machine, and automatic adjustment of the longitudinal inclination of the crop pickup device about the transverse axis as a function of two offset measured distances in conjunction with at least one nominal working position.

In particular, the cutting height of a crop pickup device constructed as a header can be determined from two offset ground distance values spaced apart from each other in the direction of travel, and adjusted automatically by a control device accordingly in conjunction with a selected cutting height. As a result, improved maintenance of the desired cutting height is obtained, particularly when the inclination of the ground changes.

By simultaneous determination of the distance to the ground the accuracy of determination of the inclination of the ground relative to the crop pickup device can be further increased, and the corresponding controls of the position of the crop pickup device, that is, maintenance of the distance to the ground, can be improved considerably.

In an embodiment of the invention, the measuring devices determine a first distance to the ground at a point located ahead of crop pickup, and a further measured distance to the ground at a point located behind crop pickup. As a result, considerable distance between the two points offset in the direction of travel at which the ground is scanned is achieved. This advantageously provides accurate determination of the position of the crop pickup device relative to the ground. Furthermore, advantageously, by first scanning ahead before the crop pickup and then scanning the distance to the ground in the region of the crop pickup device achieves reliable monitoring of the height of the crop pickup device above the ground. Further, almost exact control of the position of the crop pickup device relative to the ground is possible, so that damage to the crop pickup device and to the ground is reduced and harvesting losses are advantageously avoided.

In a further embodiment of the invention, the measuring devices on the agricultural harvesting machine determine the distance to the ground at two points located one behind the other on one track in the direction of travel. This determination yields accurate determination of the ground contour or of the crop pickup device position in relation to the ground in the direction of travel. For the first time by this means the so called cutting angle of the crop pickup device can be automatically adjusted and guided by a control device according to the sensed orientation of the crop pickup device relative to the ground and a given nominal standard. That is, the crop pickup device can be pivoted about a horizontal transverse axis and about a central axis for maintenance of the cutting angle. In particular for headers and corn headers, the cutting angle can advantageously be kept automatically controlled in the working mode of the agricultural harvesting machine, in which case it is completely irrelevant whether the agricultural harvesting machine is harvesting uphill or downhill or different cutting heights are selected or the drive wheels sink into the ground. The crop pickup device is in this case, with corresponding linkage to the agricultural harvesting machine, guided automatically in the position relative to the ground advantageously with a constant cutting angle and with a constant cutting height. As a result, optimum crop pickup and a uniform stubble height are obtained.

In a particular embodiment of the invention, the crop pickup device is carried by a feeder housing, mounted vertically movably on the agricultural harvesting machine, and on the side of the feeder housing facing towards the crop pickup device is arranged a measuring device. Such an arrangement advantageously affords the possibility that the measuring device can be used independently of the crop pickup devices and moreover, when the crop pickup device is removed, as is the case during transport travel of the agricultural harvesting machine, the measuring device can remain on the agricultural harvesting machine. As a result, an electrical coupling between the header and feeder housing is possible. This also provides a considerable distance between the first and the second scanning points of the measuring device with the scanning points being spaced apart in the direction of travel.

In an advantageous manner, the measuring device is arranged above the crop and from there determines the distance to the ground. Due to this arrangement, combined use of the measured distance values is possible. For example, from the measured distance values of a crop edge measuring device arranged above the standing crop, the distance to the standing crop ahead can be determined and the variation in inclination of the standing crop or ground can be detected longitudinally as well as transversely and used for adjustment of the position of the crop pickup device relative to the ground. With this arrangement for viewing far ahead and hence early contact-free scanning of changes in the ground profile can be carried out and the crop pickup device can be guided accordingly. Further, as a result of the arrangement above the crop the very delicate measuring devices are protected from damage and can be provided structurally with simpler housings.

In another aspect, an inclination of the crop pickup device relative to the level is determined by a measuring device arranged on the crop pickup device and used to control the position of the crop pickup device relative to the ground. Determination of the distance to the ground and corresponding control of the position of the crop pickup device relative to the ground advantageously afford the possibility of also determining the inclination of the ground, by a measurement of the inclination of the crop pickup device. By this inclination value, advantageously control systems, which depend on the inclination of the ground, can make adjustments relative to the ground profile ahead.

In a further embodiment of the invention, the cutting height of a crop pickup device constructed as a header is determined from two offset ground distance values spaced apart from each other in the direction of travel, and the cutting height is automatically adjusted in conjunction with a nominal cutting height by a control device according to the measured ground distance values. By the two measured distances to the ground, advantageously the ground contour or profile relative to the crop pickup device and in particular the position of a cutting device such as a finger bar on the crop pickup device and hence the cutting height can be calculated in conjunction with the arrangement of the measuring device on the crop pickup device. As a result, more precise maintenance of the desired cutting height can be obtained on varying terrain too.

Further features and advantages of the present invention, as well as the structure and operation of various embodiments of the present invention, are described in detail below with reference to the accompanying drawings.

BRIEF DESCRIPTION OF THE DRAWINGS

Reference is now made to the drawings which illustrate the best presently known mode of carrying out the invention and wherein similar reference characters indicate the same parts throughout the views.

DETAILED DESCRIPTIOIN

Figure 1:
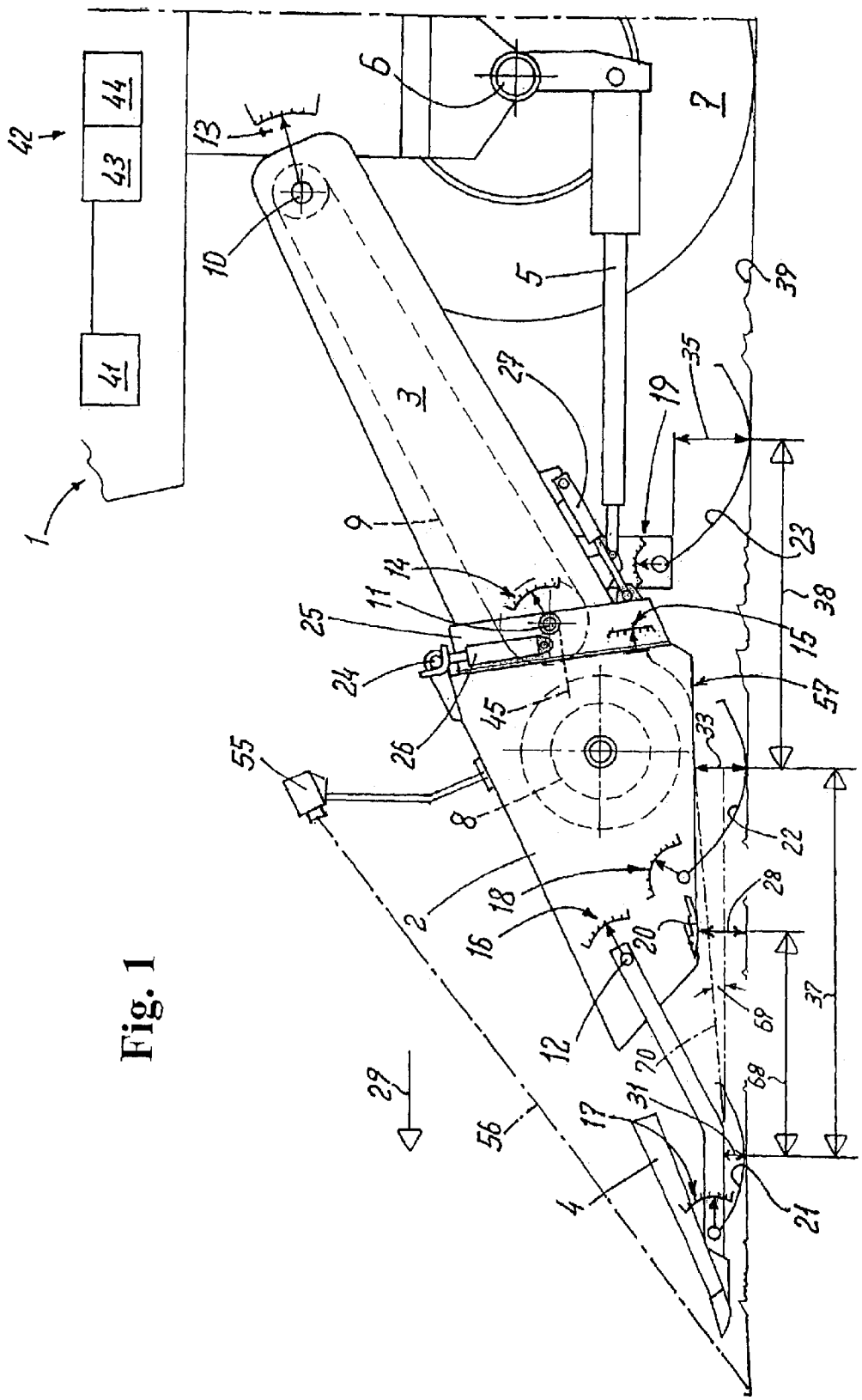
FIG. 1 is the side view of a combine harvester with a crop pickup device constructed as a header.

FIG. 1 shows a combine harvester 1 with a feeder housing 3 and a header 2 arranged at a front end thereof. The feeder housing 3 is arranged to be movable about a pivot axis 10 on the combine harvester 1 and can be pivoted by at least one lifting cylinder 5. The lifting cylinder 5 is linked to an axle 6 for vertical guiding of the header 2 over ground 39. A swinging adapter 25 is arranged at the front end of the feeder housing 3 in a direction of travel 29 of the combine harvester 1. The swinging adapter 25 is mounted movably on a transverse axis 11. At least one lifting cylinder 27 linked to the feeder housing 3 engages the swinging adapter 25 with its piston rod and enables controlled pivoting of the swinging adapter 25 about the transverse axis 11. The header 2 is mounted so as to be pivotable about an ideal longitudinal axis 45 (best seen in FIG. 2). For this purpose, lifting cylinders 26 are arranged on each of the two sidewalls of the swinging adapter 25. The respective piston rod is equipped with a supporting journal 24 at its free end and engages in corresponding receptacles on the header 2. A controlled movement of the lifting cylinders 26 can pivot the header 2 about the longitudinal axis 45 relative to the swinging adapter 25 or to the combine harvester 1.

Crop dividers 4 are mounted to the respective sidewall of the header 2. The crop dividers 4 are vertically movable about a pivot axis 12. For optimum simulation of the header 2. In the depicted embodiment, an electrical control system 43 drives a hydraulic control system 44 for the lifting cylinders 5, 26, 27 connected thereto in such a way that the header 2 is guided over the ground 39 with a constant cutting height 28, while at the same time maintaining a predetermined cutting angle. The cutting angle is here, as is known in the art, defined as an angle directed in the direction of travel 29 between the inclined plane surface of the cutting blade of a finger bar 20 and a surface of the ground 39.

An operator of the combine harvester 1, by means of an operating device 41, which is preferably arranged in the driver's cab, and connected to the control device 42, presets the combine harvester 1 and also the cutting height 28 of the header 2. This presetting also can be automatically derived directly from the general settings of the combine harvester 1. The equipment of the agricultural harvesting machine 1 with the attached crop pickup device as well as the crop to be harvested can be generally pre-selected in the operating device 41 of the agricultural harvesting machine 1 or determined automatically. A presetting for the optimum cutting angle of the header 2 and a suitable cutting height 28 can automatically be derived from these parameters. The control device 42 now compares the distances from the header 2 to the ground 39 determined by the sensors 16, 17, 18, 19 with the cutting height and cutting angle settings. The control device 42 drives the lifting cylinders 5, 27 as a function of a possible deviation in such a way that the cutting height and cutting angle settings are maintained as precisely as possible or at least as best as possible. In the electrical control system 43 in a storage means for each sensor 13, 14, 15, 16, 17, 18, 19 are filed characteristic curves or tables of values, for conversion of the sensor signals to absolute distances or angles. These characteristic curves or tables of values can be permanently preset or learned. In a corresponding learning routine, the corresponding detection variable is then moved manually or automatically throughout the possible range of adjustment, and the detected sensor value is assigned by means of a characteristic curve or table of values to a known distance ground simulation and picking up crop from the field a plurality of sensors 13, 14, 15, 16, 17, 18, 19 described in more detail below are mounted on the combine harvester 1 as shown in FIG. 1. While only one side of the agricultural machine is shown, those skilled in the art would understand that the plurality of sensors could be mounted on either side or both sides.

Figure 2:
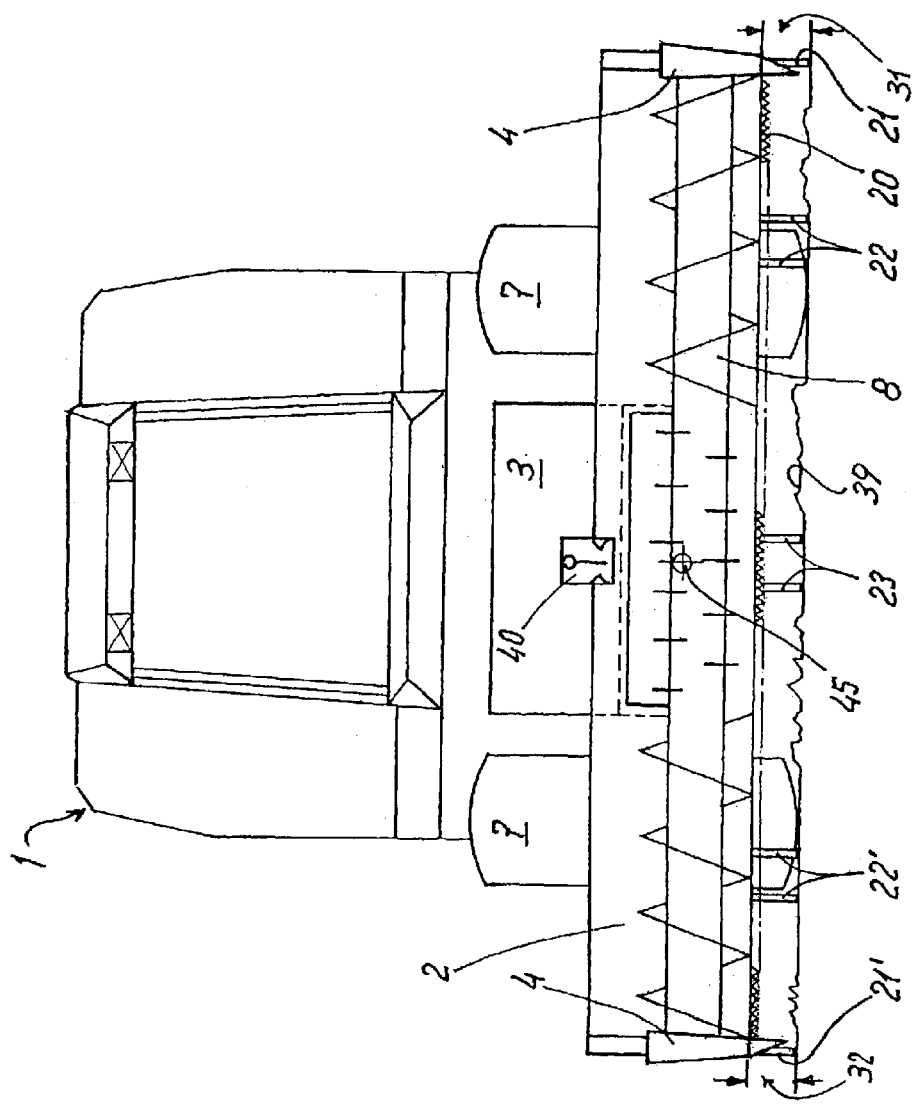
FIG. 2 is a front view of a combine harvester with header.

A first sensor 13 determines the adjustment of the feeder housing 3 relative to a support on the combine harvester 1. A second sensor 14 senses the pivot angle of the swinging adapter 25 relative to the feeder housing 3. Pivoting of the header 2 relative to the swinging adapter 25 about the longitudinal axis 45 is detected by a third sensor 15. Further, the movement of the crop divider 4 at its linkage point to the header 2 is sensed by a fourth sensor 16. A deflecting movement arises in particular when the ground 39 rises steeply in the direction of travel 29. On the lower side of the crop divider 4 is movably attached a first pair of sensing frames 21,21' extending towards the ground 39. A first distance 31 and a second distance 32 (as seen in FIG. 2) between the crop divider 4 and the ground 39 is detected by a fifth sensor 17 by the deflection of the sensing frames 21,21'. A second pair of sensing frames 22,22' is arranged on a bottom 57 of the header 2 and detects third and fourth distances 33, 34 (as seen in FIG. 2) between the header 2 and the ground 39. The first and second pair of sensing frames 21,21', 22,22' detect the first, second, third and fourth distance 31,32,33, 34 to the ground 39, seen in the direction of travel 29, at a given scanning distance 37. A third pair of sensing frames 23 is linked to the feeder housing 3. The third pair of sensing frames 23, by means of a seventh sensor 19, detects a fifth distance 35 from the feeder housing 3 to the ground 39. The second and third pair of sensing frames 22,22' and 23 are spaced apart in the direction of travel 29 with a given scanning distance 38.

The individual set and distance values detected by the plurality of sensors 13, 14, 15, 16, 17, 18, 19 are delivered to a control device 42 via individual signal wires or by means of a data bus system. The detected values are processed there in a manner which will be described in more detail below for control of ground or angle, or one which is determined in the process. Further, calibration of the apparatus can be carried out by bringing about a special preset adjustment of the position of the header 2 relative to the ground 39. For this purpose a given cutting height and a given cutting angle are set manually and checked by external measuring means. The sensor values that then prevail are then assigned to the known set values and so allow a statement about the absolute set values.

From the two scan values of the fifth and sixth sensors 17, 18, if necessary taking into account the angle value of the fourth sensor 16, the inclination of the ground 39 in the direction of travel 29 relative to the header 2 can be calculated. The sensor value of the fourth sensor 16 varies only if one complete deflection of the sensing frame 21 has taken place before the tip of the crop divider 4 is deflected by a brief high elevation of the ground 39. To calculate the inclination of the ground 39 relative to the header 2, for example, from the third measured distance 33 can be subtracted the first measured distance 31. From this difference will be determined, by means of the trigonometric tangent function in conjunction with the scanning distance 37, an angle 69 to a span 70. The angle of the span 70 to the inclination of the finger bar 20 on the header 2 is a known angle. The inclination of the finger bar 20 to the ground 39 can therefore be determined from an addition of the two known angles. A variation in the position of the crop divider 4 is detected by the fourth sensor 16, and as a result the angle of the span 70 to the finger bar 20 is varied. By the known geometric relationships, the angle between the finger bar 20 and the span 70 can be determined anew and taken into account accordingly when calculating the inclination of the ground 39 relative to the header 2. Therefore, the deflection of the crop divider 4 is detected by the control device 42 with the aid of the calculation of altered inclination, and the header 2 is pivoted accordingly about the transverse axis 11 for correction.

The cutting height 28 can be determined, for example, likewise by means of the trigonometric tangent function. For this purpose, a partial amount of the cutting height 28 is calculated from the predefined angle 69 and the distance 68 between the blades. To this partial amount is then added the first distance 31 and the distance between the span 70 and the finger bar 20. In total, this result corresponds to the instantaneous cutting height 28.

To calculate the cutting height 28, further mathematical relationships can be used. For example, with the aid of the known distances 37, 38, 68 of the respective sensors 17, 18, 19 in the direction of travel 29 and the measured distances 31, 33, 35, calculation of the cutting height 28 can be carried out by means of the angles and dimensions.

Generally, a change in the inclination of the ground 39 causes a change in the cutting height 28 and the cutting angle. The control device 42 thereupon controls the position of the feeder housing 3 and of the swinging adapter 25 coupled to it accordingly for correction, by pivoting the feeder housing 3 about the pivot axis 10 or the header 2 about the transverse axis 11, to maintain the desired cutting height 28 or the cutting angle. If, for example, the ground 39 slopes up in the direction of travel 29, this variation is first detected in direction and quantity by the fifth sensor 17 in relation to the distance value of the sixth sensor 18. Next the control device 42 drives the lifting cylinder 27 and so increases the distance from the crop divider 4 to the ground 39. This movement leads, due to the transverse axis 11 being spaced apart from the finger bar 20, to an increase in the cutting height 28. Consequently, the header 2 is again adapted to the desired cutting height 28 by the control device 42 by a lowering of the feeder housing 3 by means of the lifting cylinders 5. This cycle is repeated until, according to the further advance of the combine harvester 1 in the direction of travel 29, the variation in the inclination of the ground after the scanning distance 37 has also reached the sensing frame 22 which is arranged at a distance behind in the direction of travel 29. The variation in inclination now deflects both the first and second pair of sensing frames 21, 22 in the same direction. The control device 42 reacts to this by lifting the header 2 by means of displacement of the feeder housing 3, whereupon the crop divider 4 is further lifted again and operated at too great a distance to the ground 39. The control device 42, therefore, alters the position of the swinging adapter 25 and so lowers the crop divider 4 to the distance to the ground 39 necessary for the desired cutting height 28. These operations are repeated until, upon further advance of the combine harvester 1 in the direction of travel 29, the variation in inclination of the ground 39 has reached the tires 7 of the combine harvester 1. This now results in lifting of the whole combine harvester 1 relative to the ground 39, and causes a corresponding increase in the two measured distance values of the sensors 17 and 18. The control device 42 consequently lowers the feeder housing 3 and sets a new cutting angle. This cycle is repeated until the variation in inclination of the ground 39 which is presupposed by way of example has reached the combine harvester's rear wheels (not shown). The combine harvester 1 now travels over the altered inclination of the ground with a constant cutting height 28 and cutting angle, until a variation in inclination of the ground in the direction of travel 29 is again detected by the fifth sensor 17.

If the combine harvester 1 is a hillside combine harvester, the frame of the combine harvester 1 is lowered for optimization of the working process in the combine harvester 1. The frame is lowered relative to the axle 6 when the tires 7 reach the variation in inclination of the ground previously mentioned in the example. This also results in a lower position of the pivot axis 10 of the feeder housing 3 relative to the ground 39, and causes a change of cutting height and cutting angle. This is then detected by the fifth and sixth sensors 17, 18 and automatically leads to lifting of the feeder housing 3 and corresponding correction of the setting of the swinging adapter 25.

Generally, the reaction time and speed of the control device 42 to a changing inclination of the ground 39 in the direction of travel 29 can take place as a function of the distance covered and the known reaction times of the executing elements 5, 27, 42. The position of the ground variation in the direction of travel 29 can then be determined by this means over the lengths of the scanning distances 37 and 38. A controlled variation in cutting height 28 according to the position of the changing ground 39 and hence a uniform cutting height 28 will become possible.

The practical example was described only with reference to the first and second pair of sensing frames 21, 22, but it is quite possible for sensors 17, 18, 19 with sensing frames 21, 22, 23 to be mounted on the combine harvester 1 and evaluated for control of the position of the header 2 relative to the ground 39. Such a combination results in an improvement in detection of the ground profile at least in the direction of travel 29.

In FIG. 1, for example, the seventh sensor 19 with the third pair of sensing frames 23 is arranged on the feeder housing 3. The fifth sensed distance 35 could additionally be called up and evaluated by the control device 42. By the three offset ground distances measured at a distance apart in the direction of travel 29, the ground profile can be scanned better. Profiles that are curved or sloped in the direction of travel 29 can now be detected and used to regulate the position of the header 2 relative to the ground 39. The seventh sensor 19 can likewise be used instead of the fifth sensor 17 or the sixth sensor 18 in front, wherein in particular the arrangement of one sensor 18 on the bottom 57 of the header 2 and one sensor 19 on the feeder housing 3 easily enables scanning of the ground 29 on one track in the direction of travel 29.

The mechanical sensing frames 21, 22, 23 shown by way of example can also be designed as contact-free or roller-type sensors individually or in combination. These types of sensors are known in the art and therefore not described in more detailed. The choice of a sensor is therefore at the discretion of the expert. The working conditions of the agricultural harvesting machine, such as type of soil, soil moisture, stubble and field undergrowth, also often determine the type of sensor chosen. Thus, instead of a sensing frame there may be used sensing wheels as well as contact-free operating sensors such as ultrasound sensors, radar sensors, or laser sensors. In particular, these sensors can for example also detect the movement of supporting wheels on crop pickup devices, which are in contact with the ground. It is only important that the distance between the agricultural harvesting machine and the ground 39 in the direction of travel 29 is sensed at more than one point, spaced apart or offset. This can be carried out successively or simultaneously by several sensing frames 21, 22, 23 arranged one behind the other or by a sensor scanning in the direction of travel 29, such as a laser scanner. Advantageously, the measured distance values are recorded and evaluated successively.

Further, a distance value to the ground 39 can also be determined by an edge sensor 55 arranged above the standing crop. This edge sensor 55 contact-free senses, for example with a laser beam 56, the distance to the ground 39. With reference to a known mounting position and orientation on the header 2 or on the combine harvester 1, an absolute distance or at least a variation in distance to the ground 39 can be detected ahead and used by the apparatus for automated ground simulation of the header 2 in conjunction with distance values 31, 33, 35.

FIG. 2 illustrates a front view of the combine harvester 1 with the header 2. Distributed across the working width of the header 2 is the second pair of sensing frames 22, 22' mounted on the header bottom 57. Further, the first pair of sensing frames 21, 21' is arranged on the crop divider 4 linked to the sidewalls of the header 2. The third pair of sensing frames 23 is attached to the feeder housing 3. As can be seen from FIG. 1, these sensing frames 21, 21', 22, 22', 23 are spaced apart from each other in the direction of travel 29. In other words, the sensing frames are offset from one another. The sensing frames 21,21' in the crop dividers 4 detect the ground 39 at the same height, seen in the direction of travel 29. The second pair of sensing frames 22, 22' are likewise arranged at the same height in the direction of travel 29 and sense the ground 39 behind the first pair of sensing frames 21, 21'. The third pair of sensing frames 23 is mounted at a distance behind the ground sensors 21, 21', 22, 22' in the direction of travel 29.

From the distances 31, 32, 33, 34, 35, a transverse inclination of the ground 39 can be calculated from the sensing frames 21, 21' and 22, 22' and, in conjunction with the distances between the finger bar 20 and the sensing frames 21, 21', 22, 22', 23, converted to a transverse inclination of the ground 39 below the finger bar 20. This data can then be used to control the transverse inclination of the finger bar 20.

Complete uncoupling of the header 2 from the orientation of the combine harvester 1 relative to the ground 39 allows for optimal ground simulation, and also allows for the determination of a variation in inclination of the ground 39 ahead relative to the combine harvester 1. Further, the inclination of the ground 39 relative to a horizontal plane is detectable by this means. On the header 2 in the vicinity of the longitudinal and transverse axes 45, 11 is mounted an inclination sensor 40. The measured inclination of the ground 39 or of the header 2 can, for example, be used to control the inclination of a hillside combine harvester. This control can be in the longitudinal or transverse direction or to adjust a cleaning device of the combine harvester 1. For a hillside combine harvester, the control device may have a further inclination sensor on the axle 6 of the combine harvester 1. As a result, errors in control due, for example, to onesided tire sinking are avoided.

Figure 3:
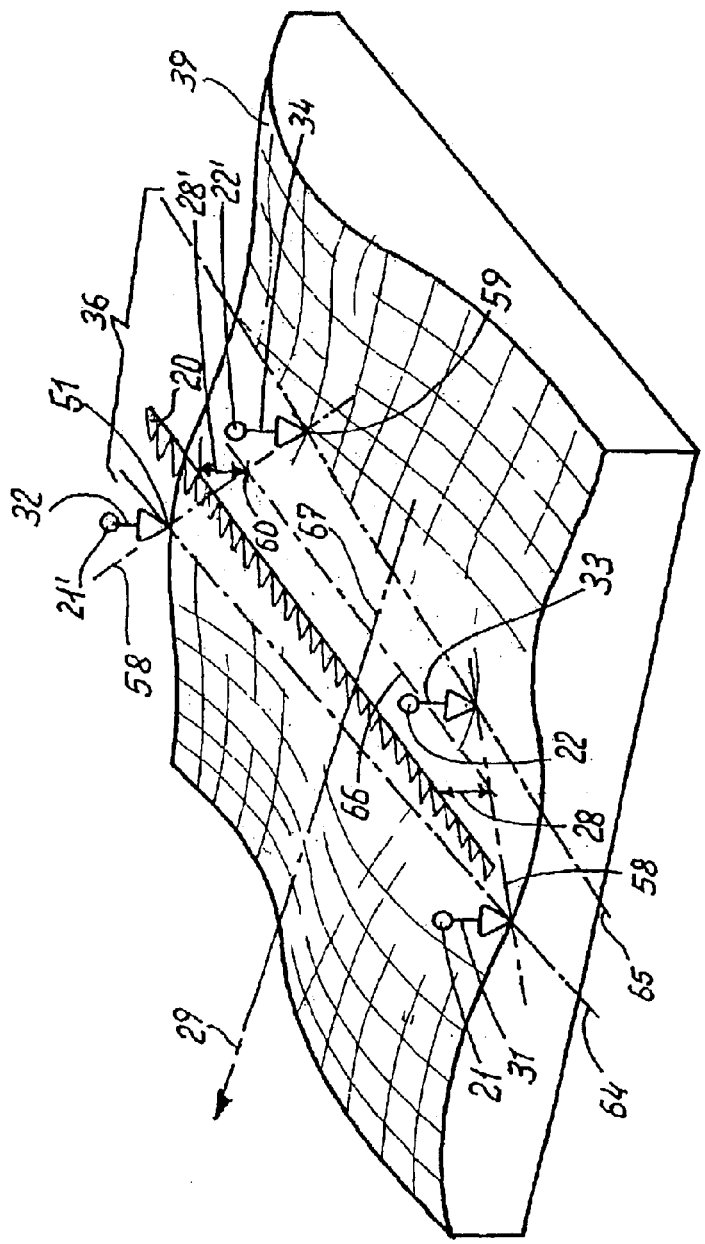
FIG. 3 is a ground surface calculated from the distance values.

As illustrated in more detail in FIG. 3, from the first and second distances 31, 32 of the sensing frames 21, 21' arranged in the crop dividers 4, the inclination of the ground 39 can be determined ahead with reference to a first connecting line 64 relative to the position of the crop dividers 4 transversely to the direction of travel 29 and parallel to the finger bar 20. This transverse inclination of the ground 39 is used by the control device 42 to adjust the transverse inclination of the header 2 relative to the ground 39. For this purpose, the lifting cylinders 26 arranged on both sides of the feeder housing 3 and shown in FIG. 1 are driven accordingly, and the header 2 is pivoted about the ideal longitudinal axis 45 for compensation until the finger bar 20 is oriented approximately parallel to the ground 39. The optimum orientation is then detected by the first and second distances 31, 32 of the sensing frames 21, 21'.

The transverse inclination along a second connecting line 65 is also sensed transversely to the direction of travel 29 by the ground sensors 22 and 22' located below the bottom 57 of the header behind the finger bar 20 in the direction of travel 29, and determined by the control device 42. From the two measured transverse inclinations of the ground 39, an average transverse inclination of the ground 39 at the height of the finger bar 20 can be calculated, for example, by the control device 42, taking into account the individual distances of the sensing frames 21, 21', 22, 22' in the direction of travel 29 relative to the finger bar 20, and used to control the transverse inclination of the finger bar 20.

Further, the curve or slope of the ground 39 can be calculated with reference to a ground area 36 from the distances 31, 32, 33, 34 by the control device 42 or another device on the combine harvester 1. The ground area 36 is defined by the position of the scanning points of the sensing frames 21, 21', 22, 22' on the ground 39 and their sensed distances 31, 32, 33, 34. The fifth sensed distance 35 of the sensing frames 23 can also be included in this case. In FIG. 3, for greater clarity the respective position of each sensing frame 21, 21', 22, 22' relative to the ground 39 is shown as a circle, and each respective sensed distance 31, 32, 33, 34 is shown by the length of an arrow. The ground area 36 shown here is slightly twisted in the direction of the sensing frame 21', as the instantaneously sensed distance 32 is smaller than the distances 31, 33, 34. As a result, a smaller cutting height 28' than cutting height 28 is detected by the control device 42 on a first connecting span 58, between scanning points 51 and 59 at the height of a cutting point 60 of the finger bar 20.

With the aid of the known arrangement of the finger bar 20 relative to the sensing frames 21, 21', 22, 22', the inclination of the finger bar 20 relative to the inclination of the calculated ground area 36 can further be determined at the height of a second connecting span 66 shown, and from this can be obtained improved control of the transverse inclination of the finger bar 20 and hence also of the position of the header 2 relative to the ground 39.

The calculated ground area 36 further indicates the inclination of the ground 39 in the direction of travel 29, here shown by a third connecting span 67. Automatic adjustment of the cutting angle can be derived from the calculated ground area 36 and the indicated inclination of the ground 39.

Figure 4:
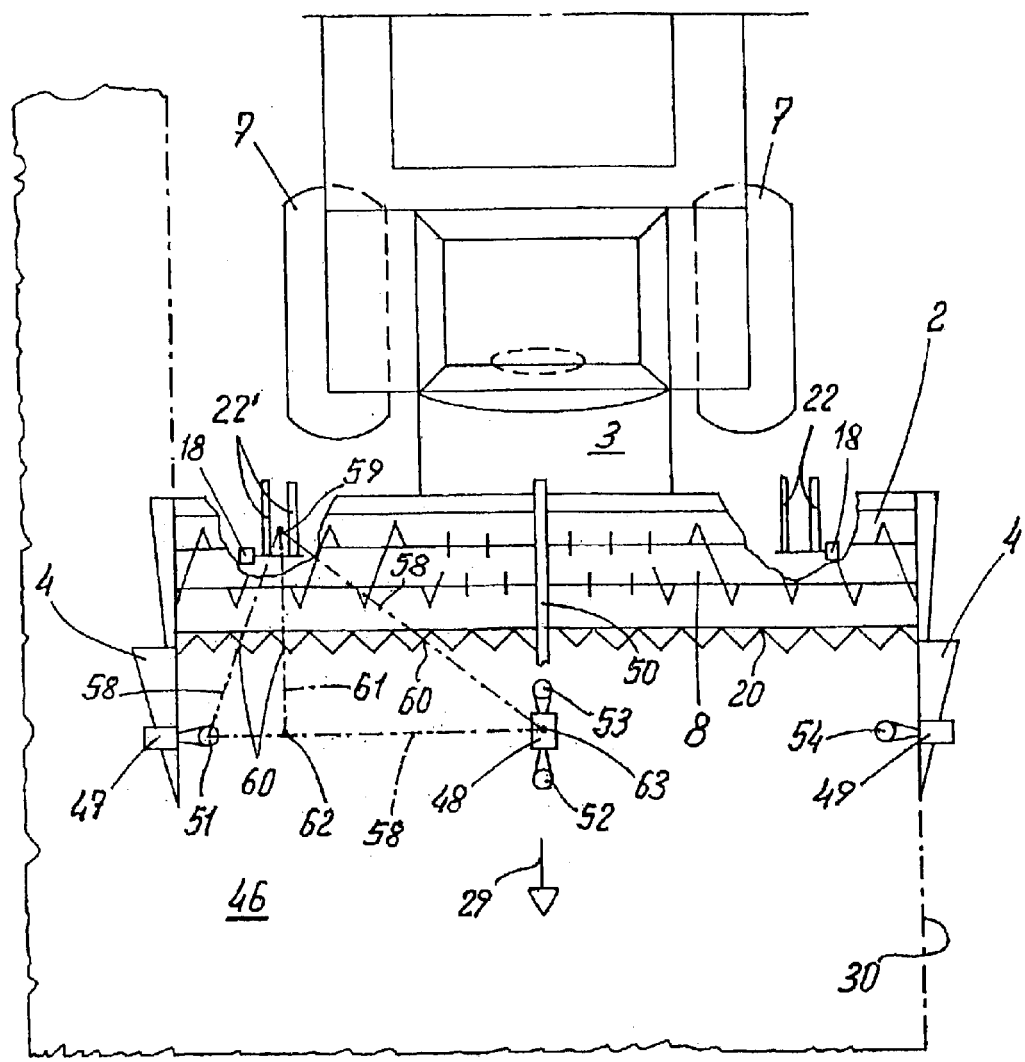
FIG. 4 is a top view of a combine harvester with header.

FIG. 4 shows a top view of the combine harvester 1 with the header 2. Radar sensors 47, 49 are mounted on each of the crop dividers 4 and oriented towards the ground 39. The radar sensor scans the distance between the radar sensor 47, 49 and the ground 39 by means of a radar wave without contact at the scanning points 51 and 54 respectively. A further radar sensor 48 is arranged above a field 46 of grain on a holding arm 50 and oriented towards the ground 39. The further radar sensor 48 scans the distance to the ground 39 in the direction of travel 29 lying on one track at two spaced-apart scanning points 52, 53. By this scanning it is possible to determine the inclination of the ground 39 in the direction of travel 29 before picking up crop from the field. As a result, the position of the header 2 and in particular the cutting height 28 and the longitudinal inclination, that is the cutting angle, can be guided automatically. In connection with the two outer radar sensors 47,49, the inclination of the ground 39 can be determined parallel to the finger bar 20 and adjusted ahead. Below the header 2, behind the finger bar 20 in the direction of travel 29 are arranged the second pair of sensing frames 22, 22' between the sidewalls of the header 2 and the feeder housing 3, each with a sensor. For example, the second sensing frame 22 is operatively connected to the sixth sensor 18. The sensing frames are arranged parallel in pairs in the direction of travel 29 and linked at one end to a common shaft, resulting in an average deflection of the sensing frames. This advantageously prevents a track or rut in the ground 39 from being scanned and leading to false measured distances.

In FIG. 4, connecting spans 58, 61 between several scanning points 51, 59, 62, 63 are shown by way of example. The respective span length is calculated from the known mounting locations of the sensors 22', 47, 48 or the position of the scanning points 51, 59, 62, 63. Further, the relative position of the finger bar 20 to these scanning points 51, 59, 62, 63 and therefore also the position of the cutting points 60 on the connecting spans 58 can be determined. The measured inclination of the respective connecting span 58, 61 allows for determination of the cutting height 28 at the respective cutting point 60. As a result, determination of the cutting height 28 distributed across the header width at several cutting points 60 is possible. Corresponding control of the transverse inclination and cutting height 28 of the header 2 can easily be carried out by this means.

The longitudinal inclination of the header 2 and hence the cutting angle can be determined for instance from the inclination of the longitudinal span 61 running in the direction of travel 29 between the scanning point 59 and the hypothetical scanning point 62 and used accordingly by the control device 42 for adjustment and maintenance of the cutting angle. The hypothetical scanning point 62 can be calculated from the first connecting span 58 between the scanning points 51 and 63, their known positions relative to the mounting locations of the sensors 22', 47, 48 on the header 2 and their currently sensed distance values to the ground 39.

The optimum arrangement of single or multiple sensors 17, 18, 19, 47, 48, 49 on different crop pickup devices or the agricultural harvesting machines 1 is often determined by the working conditions of the machine. One skilled in the art through simple testing also can easily determine the optimum arrangement.

In view of the foregoing, it will be seen that the several advantages of the invention are achieved and attained.

The embodiments are described to best explain the principles of the invention and its practical application to thereby enable others skilled in the art to best utilize the invention in various embodiments and with various modifications as are suited to the particular use contemplated.

As various modifications could be made in the constructions and operations herein described and illustrated without departing from the scope of the invention, it is intended that all matter contained in the foregoing description or shown in the accompanying drawings shall be interpreted as illustrative rather than limiting. For example, while contact sensors have been used to illustrate the invention other types of sensors could equally be used. Thus, the breadth and scope of the present invention should not be limited by any of the above-described exemplary embodiments, but should be defined only in accordance with the following claims appended hereto and their equivalents.

What is claimed is:

1. A crop cutting height maintenance system for an agricultural machine having a crop pickup device disposed to pick up crop along a crop pickup line transverse to a direction of travel of the agricultural machine, said cutting height maintenance system comprising:

a first frame mounted on the crop pickup device at a first point along the direction of travel and disposed to measure a first height between the crop pickup device and the ground;

a second frame mounted on the crop pickup device at a second point along the direction of travel, and disposed to measure a second height between the crop pickup device and the ground;

each of said first and second frames being operatively connected to a processor to signal to said processor said first height and said second height; and said processor being configured to send a change of elevation signal to a crop pickup device elevator in response to a difference between said first height and said second height, such that a cutting height of the crop pickup device is changed.

2. The crop cutting height maintenance system of claim 1 wherein said first frame is ahead of the crop pick up line and said second frame is behind the crop pickup line relative to the direction of travel.

3. The crop cutting height maintenance system of claim 1 wherein said elevation signal raises the crop pickup device and raises said cutting height when said first height becomes smaller than said second height.

4. The crop cutting height maintenance system of claim 1 wherein said elevation signal lowers the crop pickup device and lowers said cutting height when said first height is greater than said second height.

5. The crop cutting height maintenance system of claim 1 further comprising an edge sensor, said edge sensor being in operative communication with said processor.

6. The crop cutting height maintenance system according to claim 1 wherein said first ground height and said second ground height are measured simultaneously.

7. The crop cutting height maintenance system according to claim 1 wherein said first frame and said second frame are aligned in the direction of travel.

8. The crop cutting height maintenance system according to claim 1 wherein said first frame and said second frame are located on a first lateral portion of the crop pickup device and further comprising a third frame and a fourth frame located on the opposite lateral portion of the crop pickup device.

9. The crop cutting height maintenance system of claim 8 further comprising at least one additional frame.

10. The crop cutting height maintenance system of claim 1 wherein at least one frame is replaced by a contactless measuring device.

11. The crop cutting height maintenance system of claim 1 further comprising a contactless measuring device mounted on said crop pickup device and located above a top level of a crop.

12. The crop cutting height maintenance system of claim 1 further comprising an inclination sensor mounted on the crop pickup device and disposed to measure an inclination of the crop pickup device relative to a horizontal plane.

13. The crop cutting height maintenance system of claim 1 wherein said processor is further configured to send a change of angle signal to a crop pickup device in response to a change in said first height or said second height, such that a cutting angle of the crop pickup device is changed.

14. The crop cutting height maintenance system of claim 12 wherein said processor is further configured to send a change of angle signal to a crop pickup device in response to a change in an inclination sensed by said inclination sensor.

15. The crop cutting height maintenance system of claim 9 wherein said processor is further configured to send a change of transverse angle signal to the crop pickup device in response to a difference between a height measured on said first lateral portion of the crop pickup device and a height measured on said opposite lateral portion of the crop pickup device.

16. The crop cutting height maintenance system of claim 1 wherein said processor is further configured to determine a curve for a connective span between a plurality of measured ground heights along the direction of travel and wherein said processor is further configured to automatically maintain a selected cutting height as a function of the determined curve.

17. The crop cutting height maintenance system of claim 8 wherein said processor is further configured to calculate a ground area from a plurality of distances measured transversely to the direction of travel, said transversely measured heights being separated from one another along the direction of travel, and wherein said processor is further configured to determine a longitudinal inclination of a connecting span for the ground area, further configured to determine a transverse inclination of a finger bar, and further configured to automatically adjust the crop pickup device to maintain a preselected cutting angle and a preselected cutting height as a function of said calculated ground area.

18. The crop cutting height maintenance system of claim 1 wherein said crop pickup device elevator is comprised of a plurality of lifting cylinders.

19. The crop cutting height maintenance system of claim 1 further comprising a swinging adapter.

20. A position control apparatus for a crop pickup device comprising;
  a mount disposed to move the crop pickup device relative to an agricultural harvesting machine;
  a measuring device configured to determine distances from the crop pickup device to the ground at a plurality of points spaced from each other in a direction of travel of the agricultural harvesting machine, the measuring device including:
    at least one equipment position sensor, said equipment position sensor being configured to signal to a control device a determined position of one equipment component relative to at least one other equipment component;
    at least one mechanical ground sensor, said mechanical ground sensor being configured to signal to the control device a determined position of at least one equipment component relative to the ground;
    at least one contactless ground sensor, said contactless ground sensor being configured to signal to the control device a determined position of at least one equipment component relative to the ground;
    at least one other sensor, the at least one other sensor being either an equipment position sensor or a mechanical ground sensor; and
    the control device being configured to adjust a position of the crop pickup device as a function of the determined positions.

21. The apparatus according to claim 20, wherein the measuring device simultaneously determines the distance to the ground at the plurality of points.

22. The apparatus according to claim 20, wherein the measuring device determines a first distance to the ground at a point located ahead of the crop pickup device in the direction of travel, and a second distance to the ground at a point located behind the crop pickup device in the direction of travel.

23. The apparatus according to claim 20, wherein the measuring device determines the distance to the ground at a plurality of aligned points located one behind the other on one track in the direction of travel.

24. The apparatus according to claim 20, wherein the crop pickup device mount includes a feeder housing mounted for vertical movement relative to the agricultural harvesting machine, and wherein one of said at least one ground sensors of the measuring device is arranged on a side of the feeder housing facing toward the crop pickup device.

25. The apparatus according to claim 20, wherein the measuring device includes a plurality of measuring devices spaced from each other transversely to the direction of travel, wherein each of the measuring devices determines a plurality of distances to the ground.

26. The apparatus according to claim 20, wherein the mechanical ground sensor is a frame sensor.

27. The apparatus according to claim 20, wherein the mechanical ground sensor is selected from the group consisting of: a frame sensor behind the crop pickup device, a frame sensor in front of the crop pick up device and a feeder housing frame sensor.

28. The apparatus according to claim 20, wherein the contactless measuring device is disposed proximate to a crop height.

29. The apparatus according to claim 20, wherein the measuring device includes an edge sensor.

30. The apparatus according to claim 20, including an inclination sensor on the crop pickup device configured and disposed to determine a position of the crop pickup device relative to a horizontal plane.

31. The position control apparatus for crop pickup device of claim 20 wherein said contactless ground sensor is mounted on the crop pickup device.

32. The position control apparatus of claim 20 wherein said equipment position sensor is selected from the group consisting of:

a feeder housing adjustment sensor;
a swing adapter pivot sensor;
a header tilt sensor; and
a crop divider linkage angle sensor.

33. A method for position control of a crop pickup device mounted on an agricultural harvesting machine for movement relative thereto, and with at least one measuring device for determining the distance from the crop pickup device to the ground, the method comprising the steps of:
measuring a first distance to the ground with a contactless sensor;
measuring a second distance to the ground with a mechanical ground sensor;
monitoring a position of a first equipment component relative to a second equipment component;
sensing at least one other parameter with either an equipment position sensor or a mechanical ground sensor; and
automatically adjusting a position of the crop pickup device relative to the ground as a function of the measured distances, monitored position and at least one other parameter.

34. The method according to claim 33, wherein the step of automatically adjusting the position of the crop pickup device includes the step of adjusting a transverse inclination of the crop pickup device about a longitudinal axis lying in the direction of travel.

35. The method according to claim 33, wherein the step of automatically adjusting the position of the crop pickup device includes the step of adjusting a longitudinal inclination of the crop pickup device about an axis transverse to the direction of travel.

36. The method according to claim 33, further comprising the steps of selecting a cutting height; determining a curve for a connecting span between a plurality of measured distances; and automatically maintaining the selected cutting height as a function of the determined curve.

37. The method according to claim 33, further comprising the steps of: measuring a plurality of distances spaced apart from each other transversely to the direction of travel; calculating a ground area from the plurality of measured distances spaced apart from each other in the direction of travel; determining a longitudinal inclination of a connecting span for the ground area; determining a transverse inclination of a finger bar; and automatically adjusting the crop pickup device to maintain a pre-selected cutting angle and a pre-selected cutting height.

38. A position control apparatus for a crop pickup device mounted on an agricultural harvesting machine, the agricultural machine having a direction of travel and the crop pickup device including a finger bar, the position control apparatus comprising:
a first measuring device for measuring a first distance value, the first measuring device operatively connected to the agricultural machine and located on the crop pickup device ahead of the finger bar in the direction of travel;
a second measuring device for measuring a second distance value offset from the first distance value, the second measuring device operatively connected to the agricultural machine and located on the crop pickup device aft of the finger bar in the direction of travel; and
an adjusting member configured to automatically adjust the crop pickup device as a function of the first and second distance values.

39. The apparatus according to claim 38, wherein the adjusting member includes a plurality of lifting cylinders and a control device.

40. The apparatus according to claim 38, the apparatus further comprising:
a pivot disposed to pivot the crop pick up device in at least two directions.

41. The position control apparatus for a crop pickup device of claim 38 wherein at least one mechanical ground sensor is mounted forward of a crop pickup device and at least one other mechanical ground sensor is mounted to the rear of the crop pickup device.

42. The position control apparatus for a crop pickup device of claim 38 wherein said mechanical ground sensor positioned in front of said crop pickup device measures the position of the crop pickup device relative to the ground at a position substantially proximate to the crop pickup device, and said contactless ground sensor measures the position of the crop pickup device relative to the ground at a distance forward and remote from the crop pickup device.

43. The apparatus according to claim 38, wherein the pivot includes a swinging adapter.

44. A position control apparatus for crop pickup device comprising:
a feeder housing adjustment sensor;
a swing adapter pivot sensor;
a header tilt sensor;
a crop divider linkage angle sensor;
a front crop divider frame sensor;
a back crop divider frame sensor;
a feeder housing frame sensor;
a contactless ground sensor;
each of said sensors being configured to signal a measurement to a control device; and
said control device being configured to adjust a position of the crop pickup device relative to the ground as a function of the determined measurements of said sensors.

45. The position control apparatus for a crop pickup device of claim 44 wherein said control device is configured to signal an adjustment of a position of the crop pickup device based upon input from at least four of said sensors.

* * * * *